(12) United States Patent
Miyazaki

(10) Patent No.: US 6,592,179 B1
(45) Date of Patent: Jul. 15, 2003

(54) SYSTEM FOR VEHICLE PASSENGER SEAT ADVERTISING

(75) Inventor: Koki Miyazaki, Honolulu, HI (US)

(73) Assignee: KWJ International, LLC, Honolulu, HI (US)

(*) Notice: Subject to any disclaimer, the term of this patent is extended or adjusted under 35 U.S.C. 154(b) by 0 days.

(21) Appl. No.: 09/522,809

(22) Filed: Mar. 10, 2000

(51) Int. Cl.⁷ ............................................. A47B 39/00
(52) U.S. Cl. ................................. 297/146; 297/188.07
(58) Field of Search ........................ 40/320; 297/146, 297/144, 188.07, 188.04, 463.2

(56) References Cited

U.S. PATENT DOCUMENTS

| | | | |
|---|---|---|---|
| 125,521 A | * | 4/1872 | Beidler |
| 2,025,393 A | * | 12/1935 | Kupfer |
| 2,619,395 A | * | 11/1952 | Kent |
| 3,615,118 A | * | 10/1971 | Buxton |
| 3,702,034 A | * | 11/1972 | Pfeiffer |
| 3,795,422 A | * | 3/1974 | Robinson et al. |
| 5,010,668 A | * | 4/1991 | Zeligson |
| 5,292,174 A | * | 3/1994 | Ohnuma |
| 5,720,515 A | * | 2/1998 | Haffner |
| 6,059,358 A | * | 5/2000 | Demick et al. |
| 6,082,815 A | * | 7/2000 | Xiromeritis et al. |

* cited by examiner

Primary Examiner—Milton Nelson, Jr.
(74) Attorney, Agent, or Firm—Venable; Michael A. Sartori

(57) ABSTRACT

A seat has a backrest and a housing space to house a movable tray table in the backrest. The housing space is accessible from the posterior surface of the seat. The movable tray table is movable between a state of nonuse and a state of use. Advertising material is located in the housing space of the backrest and is viewable when the movable tray table is in a state of use by a person facing the posterior surface of the seat. The advertising material is viewable when the movable tray table is in a state of use and is not viewable and inaccessible when the movable tray table is in a state of nonuse.

24 Claims, 11 Drawing Sheets

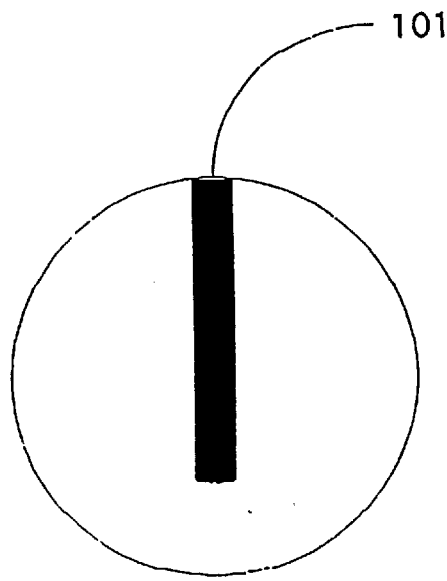
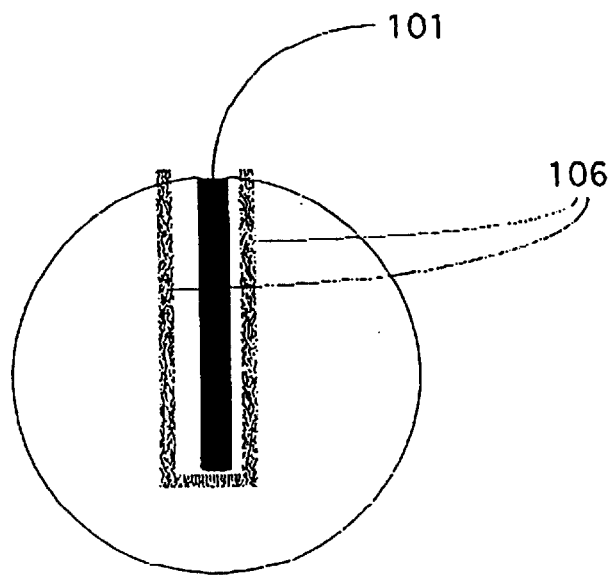
FIG. 19         FIG. 20
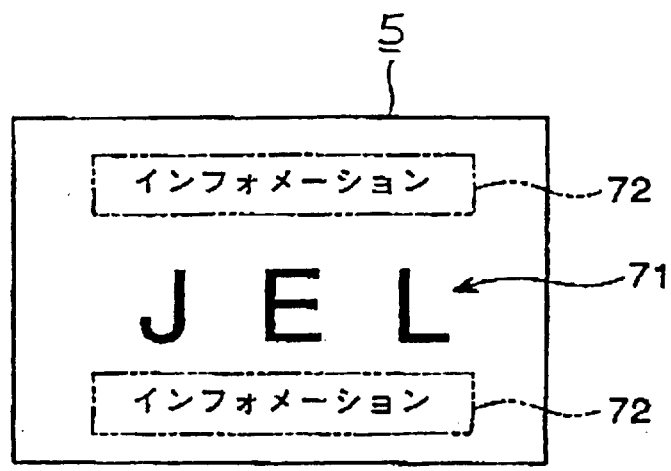
FIG. 21

SYSTEM FOR VEHICLE PASSENGER SEAT ADVERTISING

BACKGROUND OF THE INVENTION

1. Field of the Invention

The invention relates to a system for advertising and, more particularly, to a system for advertising for the passenger seat of a vehicle for transporting passengers.

2. Background of the Invention

In general, advertisements are displayed without environmental limitations, such as o outdoors, indoors, or inside a room, and used to promote a product with the expectation that a large amount of people will view the advertisement. Therefore, an advertisement should stand out and be clearly seen so as to be effective. However, the seemingly intrusive characteristic of an advertisement often clutters the surroundings and acts as a deterrent for most people to view and acknowledge the advertisement.

Further, providing for public advertising is often challenging when confined to small spaces. For instance, the inside compartment of a vehicle is extremely limited in space, which allows little room for extra devices, including any advertisement material. Further, if the inside compartment includes interior decoration, the space available inside the vehicle is additionally scarce. Therefore, efficient use of space is needed to preserve a comfortable environment for passengers of a vehicle and simultaneously provide advertising material within the compartment of the vehicle.

In today's competitive commercial market, there exists a need to provide additional outlets for advertising. In addition, there exists a need to provide advertisements to passengers in a vehicle. Further, there exists a need to present advertisement material to passengers in a vehicle without distracting from the comfortable mood and natural environment in the vehicle.

SUMMARY OF THE INVENTION

An object of the invention is to provide for additional outlets for advertising.

An object of the invention is to provide for presenting advertisements to passengers in a vehicle.

An object of the invention is to provide for presenting advertisement material to passengers in a vehicle without distracting from the comfortable mood and natural environment in the vehicle.

An object of the invention is to provide for advertising in a compartment in a vehicle without detracting from the ambience of the compartment and allowing an assortment of advertising material to be displayed.

Additional objects of the invention are to provide for: allowing the advertisement material to be exposed or hidden; attaching the advertisement material to a surface; and holding and/or protecting the advertisement material.

The invention includes an apparatus, a method, and a vehicle for advertising. The apparatus of the invention includes: a seat having a backrest and a housing space to house a movable tray table in the backrest. The movable tray table is movable between a state of nonuse and a state of use. The advertising material is located in the housing space of the backrest and is accessible when the movable tray table is in a state of use. The advertising material is viewable when the movable tray table is in a state of use.

The apparatus of the invention can additionally include any of the following: a removable adhesive between the advertising material and the backrest; a cover material located between the advertising material and the backrest, where the cover material can be a tough decorative cover material; a protective sheet located between the cover material and the advertising material; and where the protective sheet comprises a transparent material; a removable adhesive between the cover material and the protective sheet; a receptacle pocket to contain the advertising material, where the receptacle pocket comprises at least one sealed edge, where the receptacle pocket comprises one of the flap and a removable adhesive, and/or where at least on side of the receptacle pocket comprises transparent material; a binding to contain the advertising material; and a clamp used to hold the bound advertising material, where a fastener is used to attach the clamp to the backrest. In addition, the advertising material can include any of the following: an advertising display sheet coupled to an advertising display; a protective lamination coupled to the advertising display; and laminated advertising material.

The method of the invention includes locating and/or presenting advertising material in a housing space of a backrest of a seat. The housing space houses a movable tray table in the backrest. The movable tray table is movable between a state of nonuse and a state of use. The advertising material is accessible when the movable tray table is in a state of use.

The vehicle of the invention comprises a seat in the vehicle. The seat has a backrest and a housing space to house a movable tray table in the backrest. The movable tray table is movable between a state of nonuse and a state of use. The advertising material is located in the housing space of the backrest and is accessible when the movable tray table is in a state of use.

The above objects and advantages of the invention are illustrative, and not exhaustive, of those which can be achieved by the invention. Thus, these and other objects and advantages of the invention will be apparent from the description herein or can be learned from practicing the invention both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 19 illustrates an exploded sectional view of the advertising material from FIG. 17.

FIG. 20 illustrates an exploded sectional view of the advertising material from FIG. 18.

FIG. 21 illustrates a sectional view of an example of displaying advertising material.

DETAILED DESCRIPTION OF THE INVENTION

In describing the invention, the following definitions are applicable throughout. Further, all examples described herein are non-limiting examples.

A "vehicle" refers to an apparatus used to transport at least one passenger. Examples of a vehicle include an automobile, a bus, a truck, a mobile home, a train, a subway, an aircraft, a boat, a ship, a ferry, a spacecraft, and any combination thereof.

"Advertising material" refers to an apparatus to present information concerning at least one of a good, service, company, and the like. The advertising material may be a plurality of advertising material or a single advertisement. Examples of advertising material include a placard, a brochure, an information guide, a catalog, a prospectus, a directory, and a schedule.

With the invention, previously unused surface area in a compartment of a vehicle is used to present advertising material. In particular, the invention uses the surface behind a movable tray table on a posterior surface of a seat to locate the advertising material. The advertising material is accessible (e.g., presented, or exposed) when the movable tray table is in a state of use and is inaccessible (e.g., not presented, or hidden) when the movable tray table is in a state of nonuse.

With the invention, the advertising material is intended to be presented to individuals seated directly in front of the advertising material. Therefore, the advertising material does not affect the surroundings or distract from the natural atmosphere in the vehicle.

Further, with the invention, different advertising material can be displayed throughout the vehicle through the placement of different advertising material behind different seats in the vehicle. This allows the display of various advertising material from seat to seat, and even the presentation of one or more advertisements for each seat.

Figure 1:
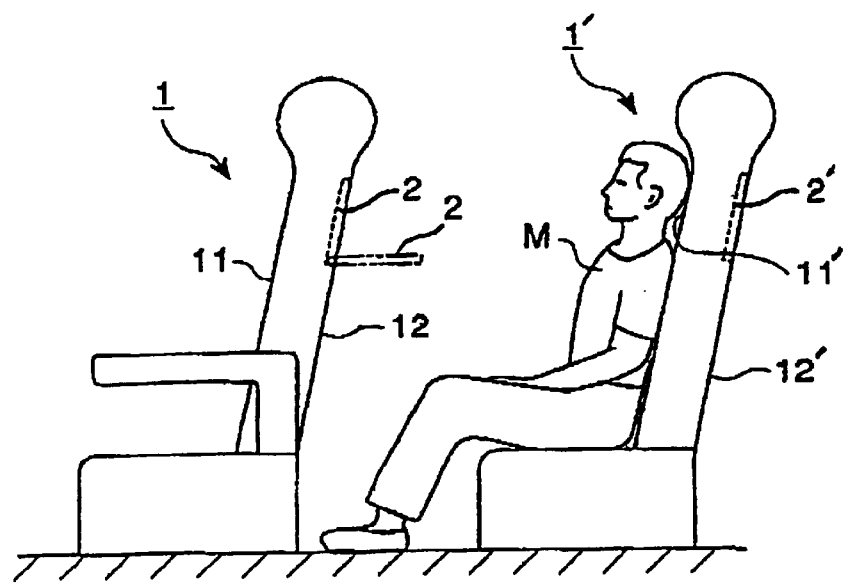
FIG. 1 illustrates an arrangement of seats and moveable tray tables in a vehicle.

FIG. 1 illustrates an arrangement of seats and moveable tray tables in a vehicle. The vehicle includes at least one seat 1 having a movable tray table 2. FIG. 1 illustrates a seat 1 and a seat 1'. The seats 1 and 1' are located in a compartment of the vehicle that transports passengers.

A person M is seated against a backrest 11' in seat 1' and has access to movable tray table 2 on a posterior surface 12 of seat 1. The seats 1 and 1' are arranged in a linear style where the person M seated against the backrest 11' faces the posterior surface 12 of the backrest 11 of the seat 1.

The movable tray table 2 has a state of nonuse and a state of use. In the state of nonuse, the movable tray table 2 is in an up position and housed within or against the posterior surface 12 of the backrest 11. In the state of use, the movable tray table 2 is in a down position, and is accessible to person M.

Figure 2:
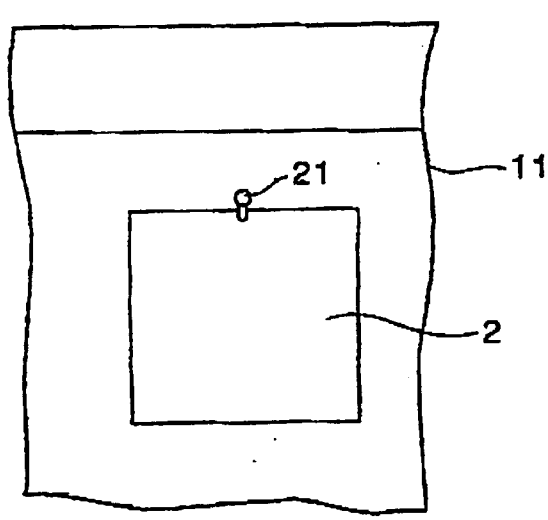
FIG. 2 illustrates a moveable tray table in a state of nonuse.

FIG. 2 illustrates the moveable tray table in the state of nonuse. In the state of nonuse, the moveable tray table 2 is housed in a housing space 3 (shown in FIG. 3) of the backrest 11. A stopper piece 21 is used to contain the moveable tray table 11 in the state of nonuse. The stopper piece 21 includes devices conventionally used to secure a movable tray table in a state of nonuse. In FIG. 2, the stopper piece 21 is in a non-released position.

Figure 3:
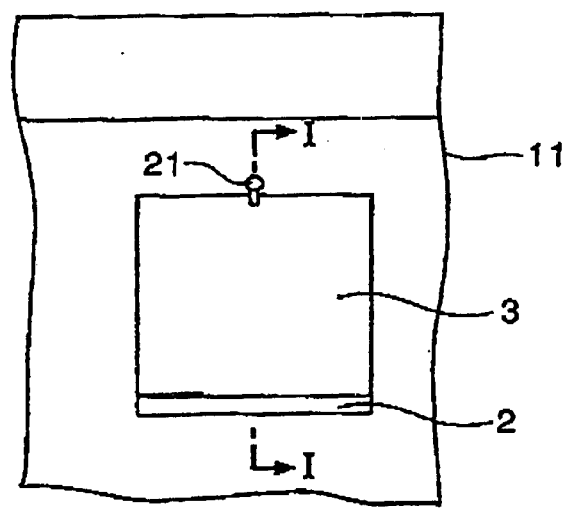
FIG. 3 illustrates a moveable tray table in a state of use.

FIG. 3 illustrates the moveable tray table in the state of use. The stopper piece 21 is in a released position, and the moveable tray table 2 is inclined and is in the state of use. The housing space 3 is of sufficient size to display advertising material 5 (identified in FIG. 4) when the moveable tray table 2 is in the state of use.

Figure 4:
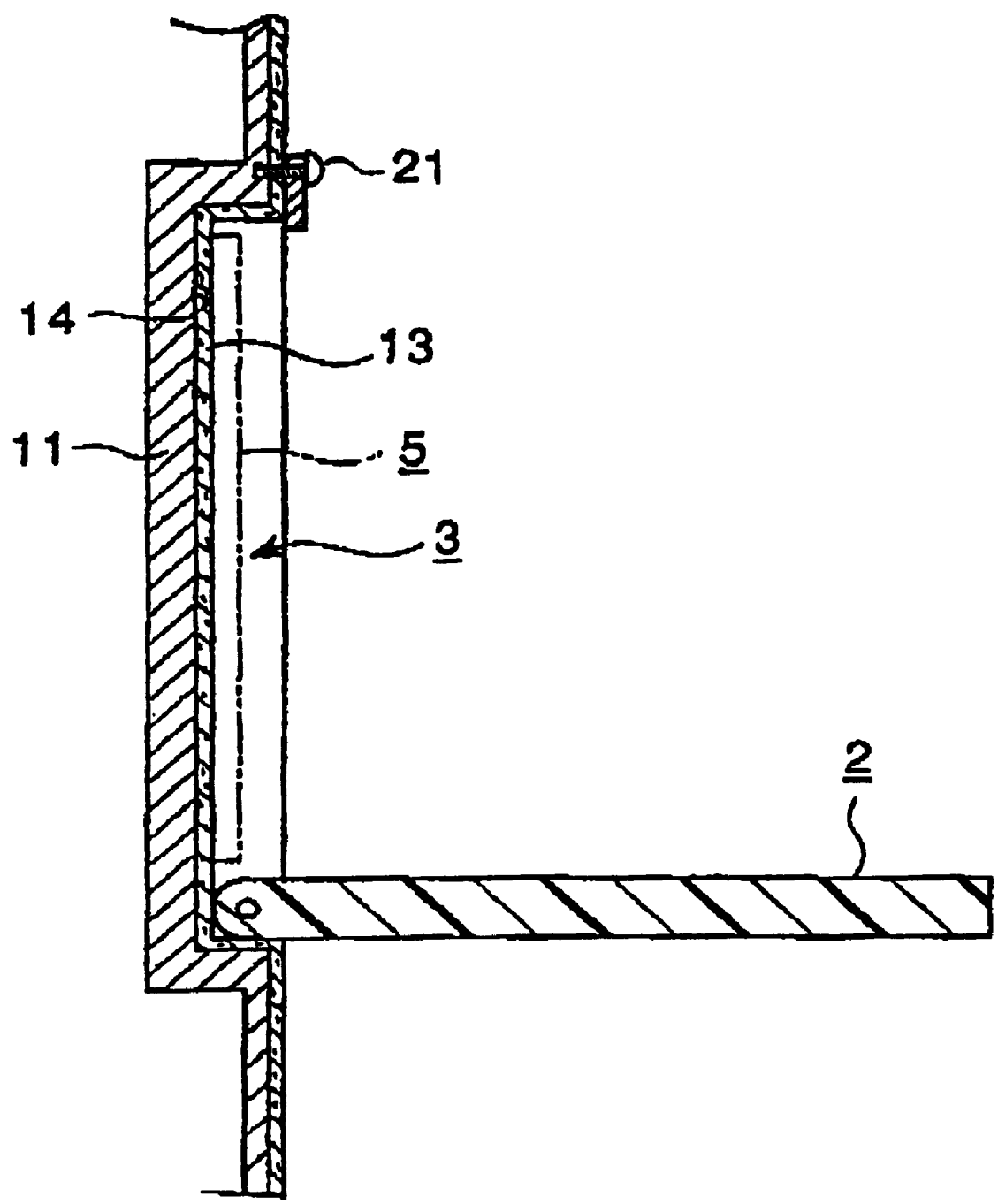
FIG. 4 illustrates a cross-sectional view of a movable tray table along line I—I of FIG. 3.

FIG. 4 illustrates a cross-sectional view along line I—I of FIG. 3. The backrest 11 of housing space 3 includes a wall surface 14, which is covered by a cover material 13. The cover material 13 can be made of the same cloth or a different cloth as the cloth which covers the backrest 11. As an option, the housing space 3 does not include the cover material 13. The advertising material 5 is displayed on the surface of the cover material 13 or on the wall surface 14 if no cover material 13 is used. The advertising material 5 is accessible when the movable tray table 2 is in the state of use and inaccessible when the movable tray table 2 is in the state of nonuse. When the movable tray table is in the state of use, the advertising material 5 is preferably viewable by the person M seated in the seat facing the advertising material 5.

The invention includes three embodiments for locating the advertising material 5 within the housing space 3 of the movable tray table 2. The first embodiment is further discussed with respect to FIGS. 5, 6A, and 6B, the second embodiment is further discussed with respect to FIGS. 7, 8A, and 8B, and the third embodiment is further discussed with respect to FIGS. 9, 10, 11, 12, and 13.

Figure 5:
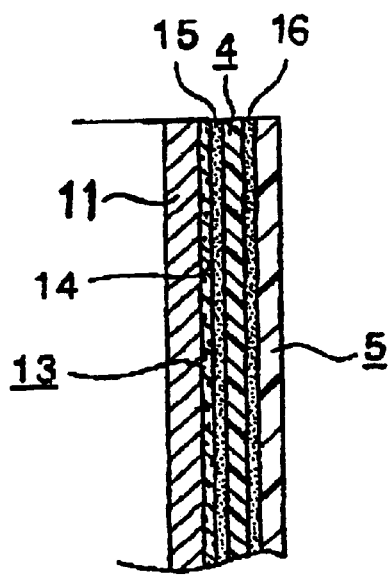
FIG. 5 illustrates a sectional view of a first embodiment of the invention.

FIG. 5 illustrates a sectional view of the first embodiment of the invention. A protective sheet 4 is removably affixed using a removable adhesive 15 to the surface of the cover material 13 covering the wall surface 14 of the backrest 11. The advertising material 5 is removably affixed to the protective sheet 4 using a removable adhesive 16.

The removable adhesives 15 and 16 can be the same material. Further, the removable adhesive 15 and 16 can be implemented with publicly known adhesives or an adhesive material. Examples to implement the removable adhesives 15 and 16 include the following: a capillary (hair-like) joining material; a hook-and-loop type fastener, such as VELCRO®, two-sided adhesive tape; and any adhesive having the ability to attach and detach and to adhere. As an option, the removable adhesive 15 can be VELCRO®, or at least one fastener, such as at least one screw, and the removable adhesive 16 can be a two-sided adhesive tape.

Figure 6A:
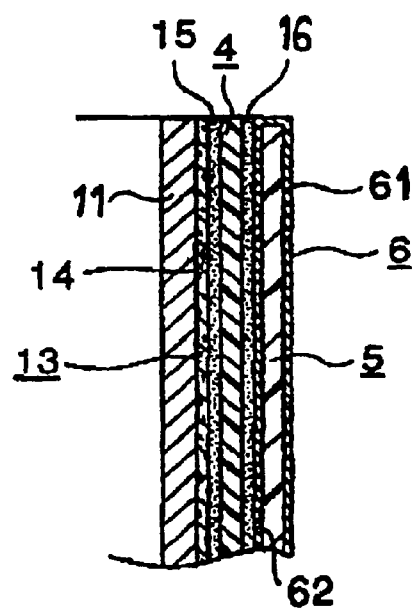
FIG. 6A illustrates a sectional view of the first embodiment equipped with a receptacle pocket.

FIG. 6A illustrates a sectional view of the first embodiment equipped with a receptacle pocket 6. The receptacle pocket 6 contains the advertising material 5 and is removably affixed to the protective sheet 4 using the removable adhesives 15 or 16.

Figure 6B:
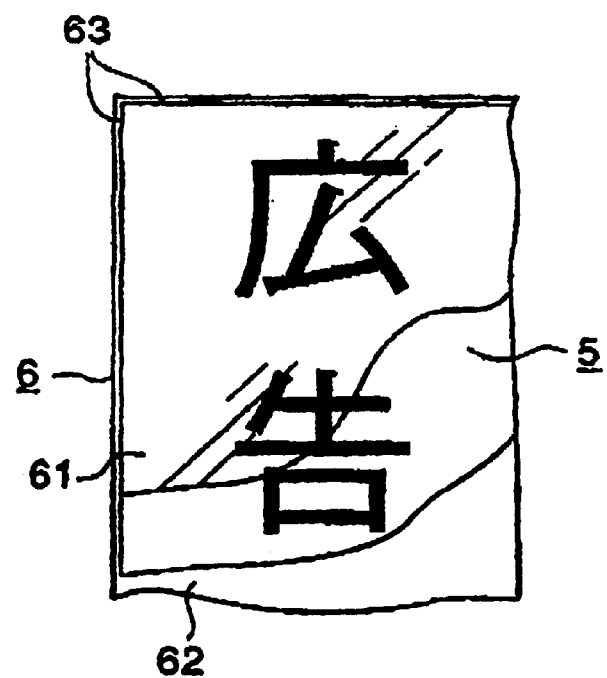
FIG. 6B illustrates a sectional view of advertising material in the receptacle pocket of the first embodiment.

FIG. 6B illustrates a sectional view of the advertising material 5 in the receptacle pocket 6 of the first embodiment. The receptacle pocket 6 has an opening on one side, which is created by adhering three of the four edges of the top surface material 61 and the bottom surface material 62 with a heat seal 63. As an option, the top surface material 61 and the bottom surface material 62 can be adhered using other techniques, such as an adhesive applied between the top surface material 61 and the bottom surface material 62. Depending on the demands of the application, a flap or a removable adhesive, such as the removable adhesives 15 and 16, can be used with the fourth non-adhered edge of the receptacle pocket 6 to open and close the receptacle pocket 6.

The receptacle pocket 6 preferably has a least one side made of transparent material. More preferably, the top surface material 61 is made of transparent material so that the person M can view the advertising material 5 when the movable tray table 2 is in a state of use. If both the top surface material 61, the bottom surface material 62, and the protective sheet 4 are made of transparent material and when the moveable tray table 2 is in a state of use, the person M can view the advertising material 5 when the advertising material 5 is in the receptacle pocket 6 and view the cover material 13 when the advertising material 5 is not in the receptacle pocket 6.

Figure 7:
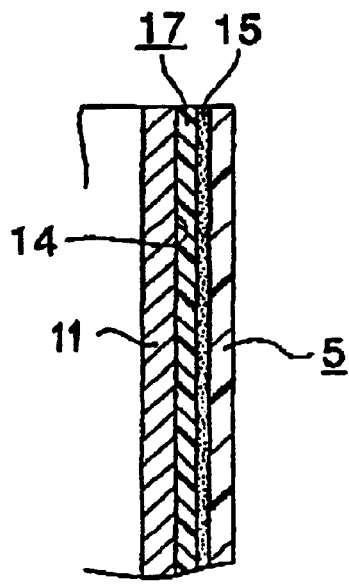
FIG. 7 illustrates a sectional view of a second embodiment of the invention.

FIG. 7 illustrates a sectional view of the second embodiment of the invention. A tough decorative cover material 17 is affixed using, for example, glue, fasteners or two-sided adhesive tape, to the wall surface 14 of the backrest 11. The advertising material 5 is removably affixed to the tough decorative cover material 17 using the removable adhesive 15.

Figure 8A:
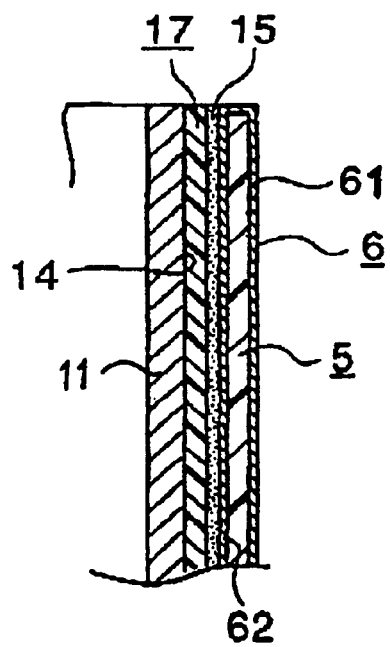
FIG. 8A illustrates a sectional view of the second embodiment equipped with a receptacle pocket.

FIG. 8A illustrates a sectional view of the second embodiment equipped with the receptacle pocket 6. The receptacle pocket 6 contains the advertising material 5 and is removably affixed to the tough decorative cover material 17 using the removable adhesive 15. The receptacle pocket 6 is of the same design as discussed above for the first embodiment.

Figure 8B:
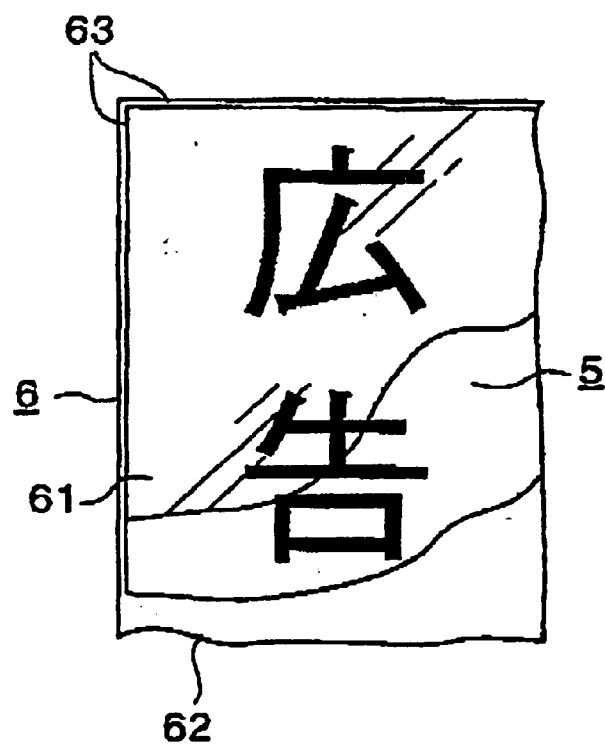
FIG. 8B illustrates a sectional view of advertising material in the receptacle pocket of the second embodiment.

FIG. 8B illustrates a sectional view of the advertising material 5 in the receptacle pocket 6 of the second embodiment.

Each of the above two embodiments can be selectively used to protect either the cover material 13 or the wall space 14 of the backrest 11. For the first embodiment, the protective sheet 4 is used as a cosmetic cover and for protection of the cover material 13. The protective sheet 4 can be made of a transparent material so as not to impede upon the decorative nature of the cover material 13 attached to the wall surface 14 of the backrest 11. For the second embodiment, the wall surface 14 of the backrest 11 is protected. The tough decorative cover material 17 is utilized to protect the wall surface 14.

Figure 9:
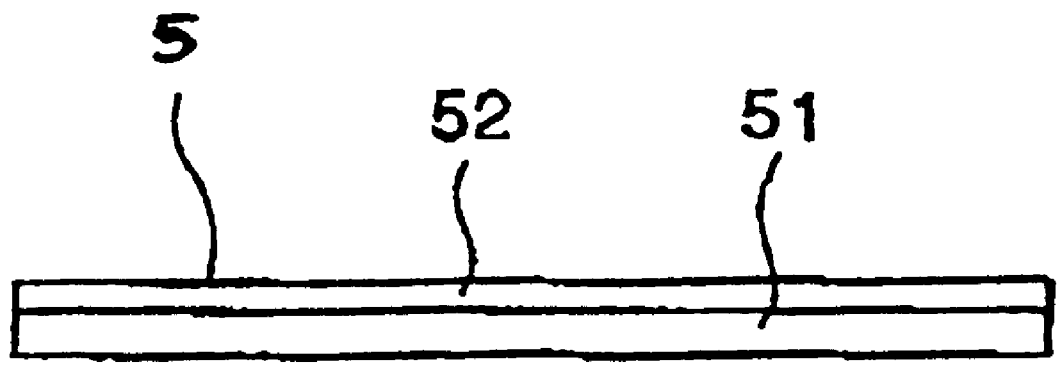
FIG. 9 illustrates a sectional view of a first alternative embodiment for the advertising material.

FIG. 9 illustrates a sectional view of a first alternative embodiment for the advertising material 5 used with any of the embodiments of the invention. For the first alternative embodiment, the advertising material 5 comprises an advertising display 52 and an advertising display sheet 51. The advertising display 52 is a thin piece of paper or plastic. As an option, the advertising display 52 is ink printed on the advertising display sheet 51. The advertising display sheet 51 is a backing used to support and protect the advertising display 52 from frequent handling when exchanging or discarding the advertising material 5. Further, the advertising display sheet 51 is affixed to the back side of the advertising display 52 by use of a removable adhesive, such as glue, two-sided adhesive tape, and heat sensitive adhesive. The advertising display sheet 51 is placed facing the backrest 11, and the advertising display 52 faces the person M.

Figure 10:
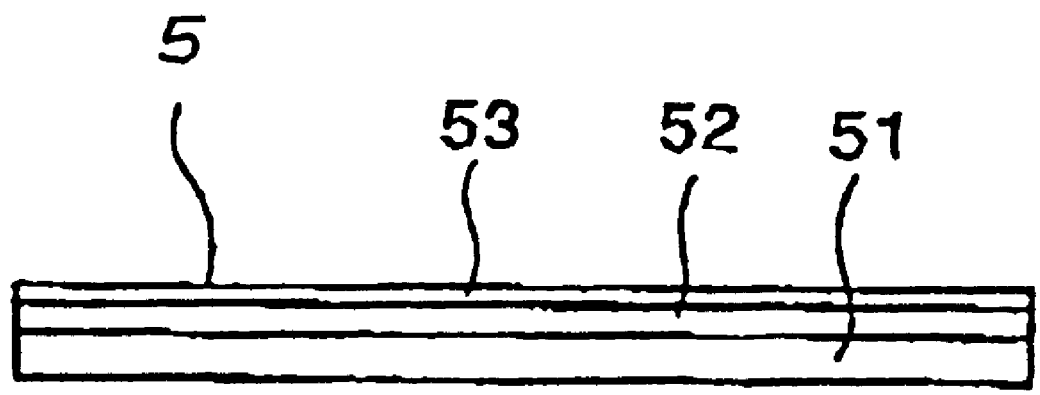
FIG. 10 illustrates a sectional view of a second alternative embodiment for the advertising material.

FIG. 10 illustrates a sectional view of a second alternative embodiment for the advertising material 5 used with any of the embodiments of the invention. For the second alternative embodiment, the advertising material 5 comprises a protective lamination 53 affixed to the front side of the advertising display 52. Further, the advertising display sheet 51 is affixed to the back side of the advertising display 52. The protective lamination 53 is affixed to the advertising display 52 using a lamination procedure, for example, a laminating film or a polymer coating. The advertising display 52 is affixed to the advertising display sheet 51 as in the first alternative embodiment of the advertising material.

The orientation of the second alternative embodiment is such that the advertising display 52 is seen through the protective lamination 53 by the person M seated in front of the advertising material 5, and the advertising display sheet 51 is placed facing the backrest 11.

The material used as the display sheet 51 and the protective lamination 53 is unrestricted and is dictated by the needs of the application. Preferably, the material used as the display sheet 51 and/or the protective lamination 53 is a transparent material. However, the display sheet 51 does not need to be transparent material.

Figure 11:
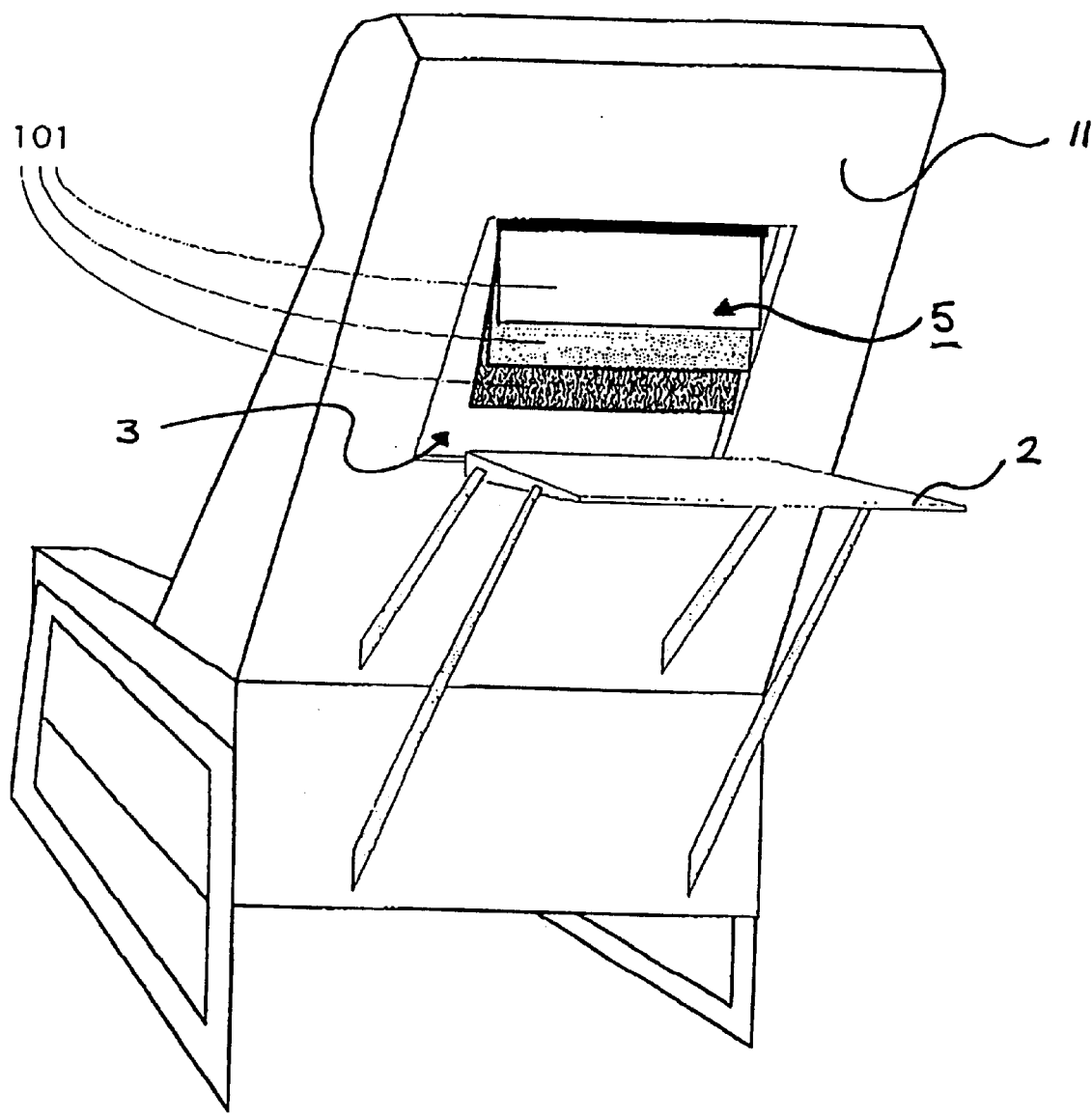
FIG. 11 illustrates a posterior view of a third embodiment of the invention.

FIG. 11 illustrates a posterior view of the third embodiment of the invention. The advertising material 5 comprises an array of advertising material 101 and is removably placed in the housing space 3 of the backrest 11. The array of advertising material 101 can include one or more sheets of advertising material. The array of advertising material 101 can be individually viewed by lifting a first advertising material to view a second advertising material. Subsequent advertising material 101, in the array, can be viewed in the same manner when the movable tray table 2 is in the state of use.

Figures 12, 13:
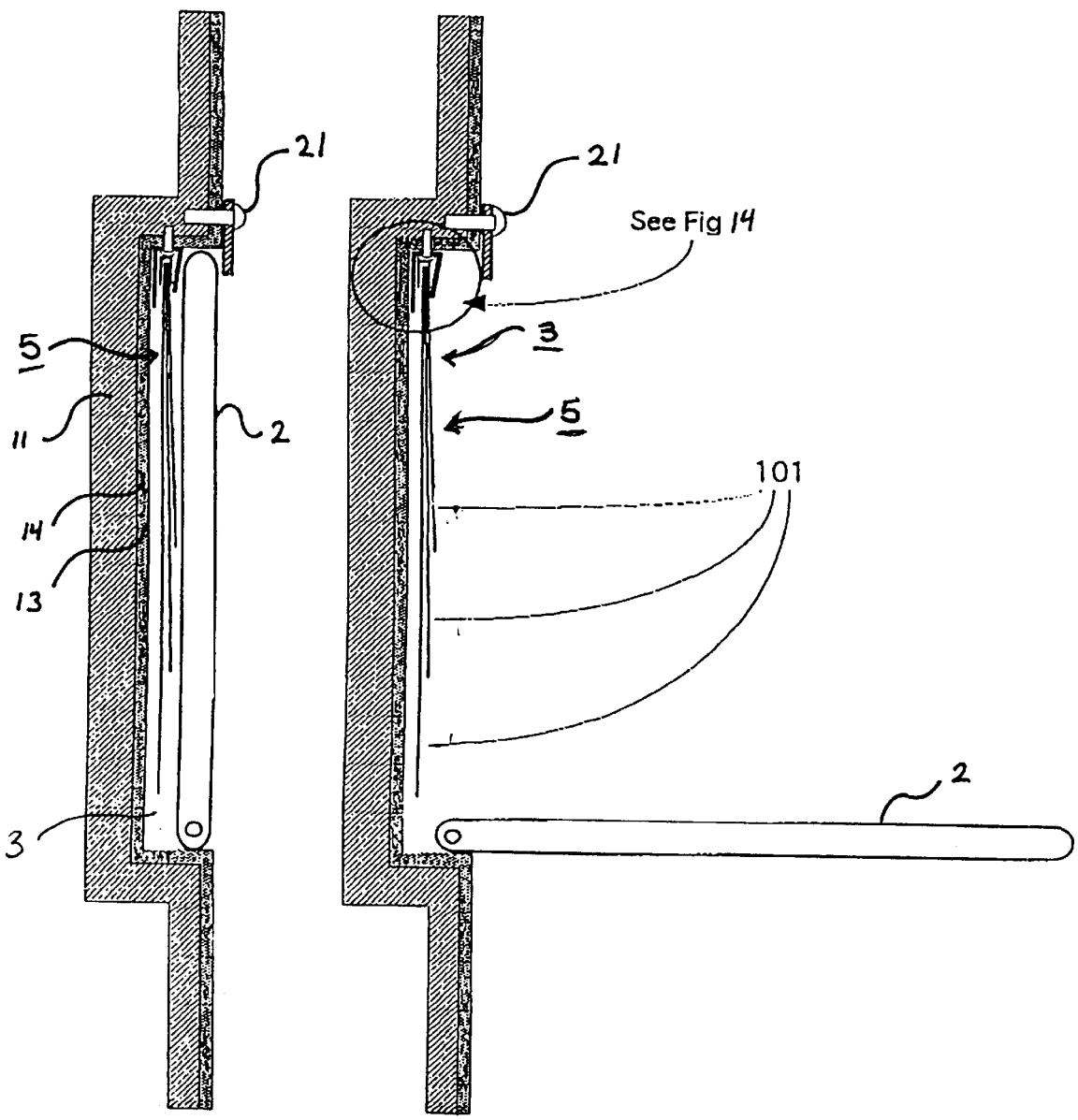
FIG. 12 illustrates a sectional view of the third embodiment where the movable tray table is in a state of nonuse.
FIG. 13 illustrates a sectional view of the third embodiment where the movable tray table is in a state of use.

FIG. 12 illustrates a sectional view of the third embodiment where the movable tray table 2 is in a state of nonuse. The housing space 3 includes a wall surface 14, which is covered by a cover material 13. The cover material 13 is made of the same cloth as the cloth which covers the backrest 11. The array of advertising material 101 is stored in the housing space 3 of the backrest 11 and is inaccessible when the movable tray table 2 is in the state of nonuse.

FIG. 13 illustrates a sectional view of the third embodiment where the movable tray table 2 is in a state of use. The array of advertising material 101 is accessible when the movable tray table 2 is in the state of use. When the movable tray table 2 is in the state of use, the array of advertising material 101 is preferably viewable by the person M seated in the seat facing the array of advertising material 101.

Figure 14:
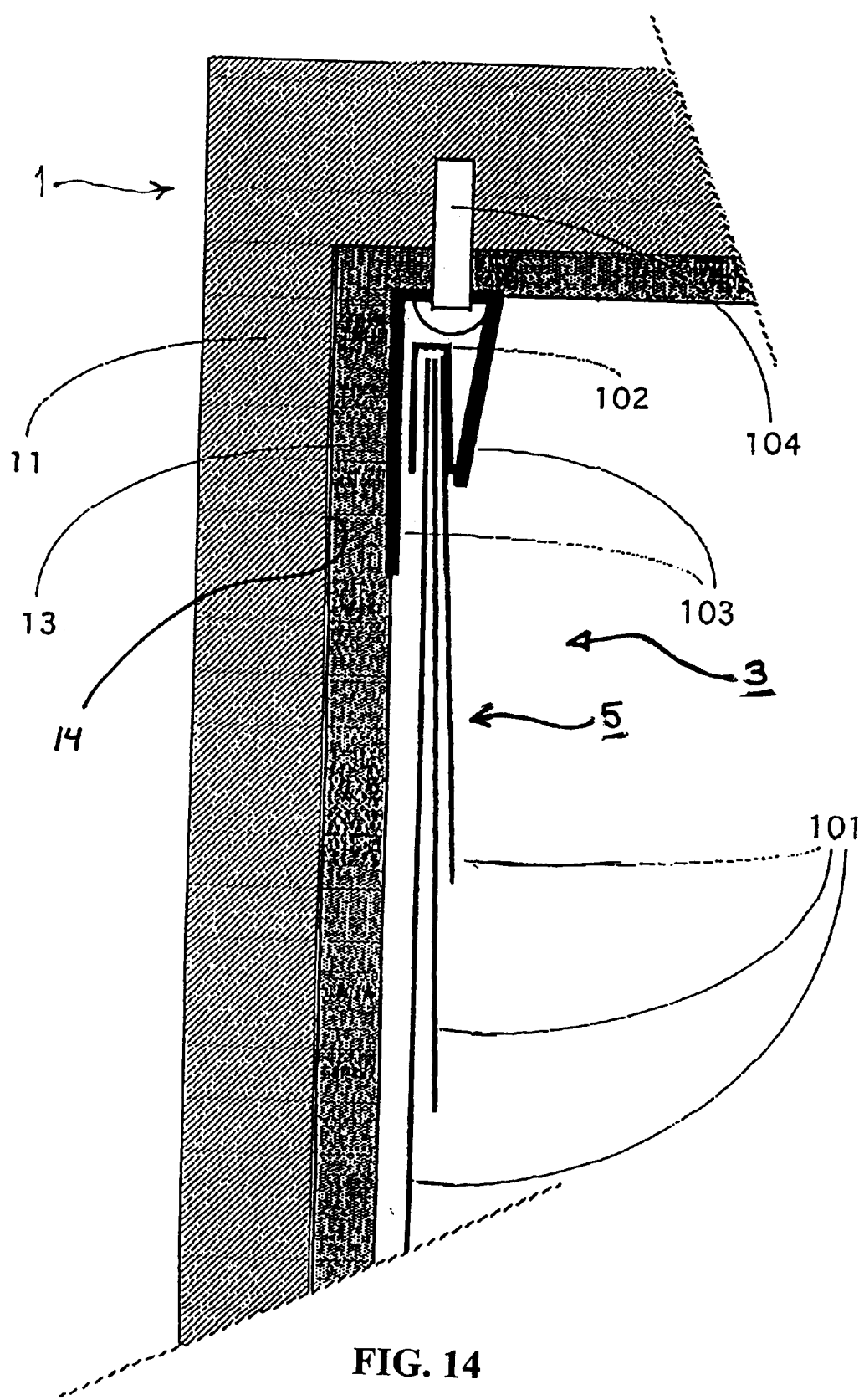
FIG. 14 illustrates an exploded sectional view of the third embodiment from FIG. 13.

FIG. 14 illustrates an exploded sectional view of the third embodiment from FIG. 13. A binding 102 is used to bind the array of advertising material 101 as a single unit. The binding 102 can be, for example, spiral binding, velo binding, and acco binding. The binding 102 allows person M to individually view each item in the array of advertising material 101 if multiple items are in the array. The bound advertising material 5 are secured in a clamp 103 and attached to the backrest 11 of the seat 1. Preferably, the clamp 103 is a material of specific geometry and spring coefficient so as to apply approximately equal pressure to either side of an object placed inside the clamp 103. The clamp 103 is designed to allow removal and replacement of the advertising material. A fastener 104, for example, a screw, is used to secure the clamp 103 to the backrest 11 of the seat 1. The fastener 104 preferably penetrates through the cover material 13 to the backrest 11.

Figure 15:
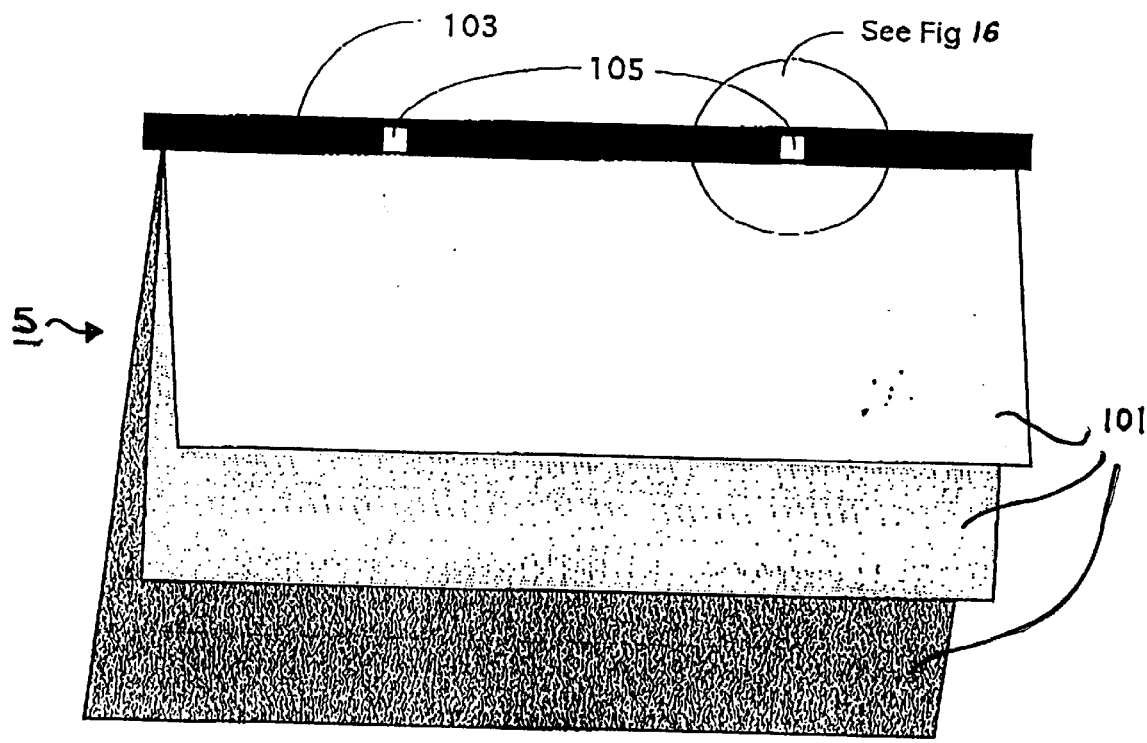
FIG. 15 illustrates bound advertising material secured in the clamp.

FIG. 15 illustrates the bound advertising material 5 secured in the clamp 103. The clamp 103 has at least two holes 105, or cut out areas, for attaching the array of advertising material 101 to the backrest 11 of the seat 1. Additionally, the holes 105 allow for prying opening the clamp 103 when removing or replacing the advertising material 5.

Figure 16:
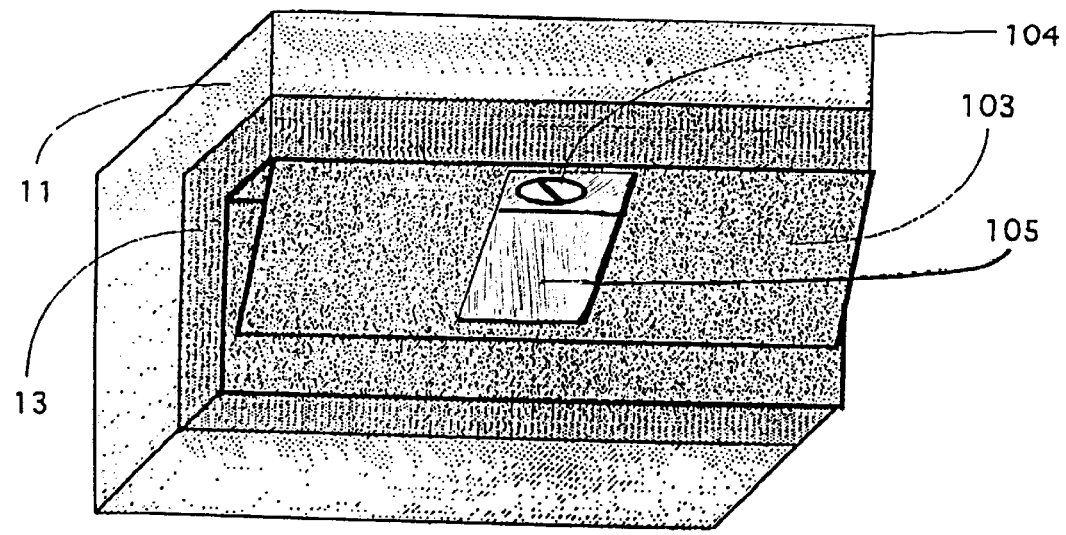
FIG. 16 illustrates an exploded plan view of the clamp from FIG. 15.

FIG. 16 illustrates an exploded plan view of the clamp 103 from FIG. 15 when attached to the backrest 11. A section of the clamp 103 and the fastener 104 are used to attach the clamp 103 to the backrest 11. The hole 105 is preferably large enough to accommodate the fastener 104, and the fastener 104 is of sufficient size to securely attach the advertising material 5 to the backrest 11. In FIG. 16, the fastener 104 is visible through the hole 105.

Figures 17, 18:
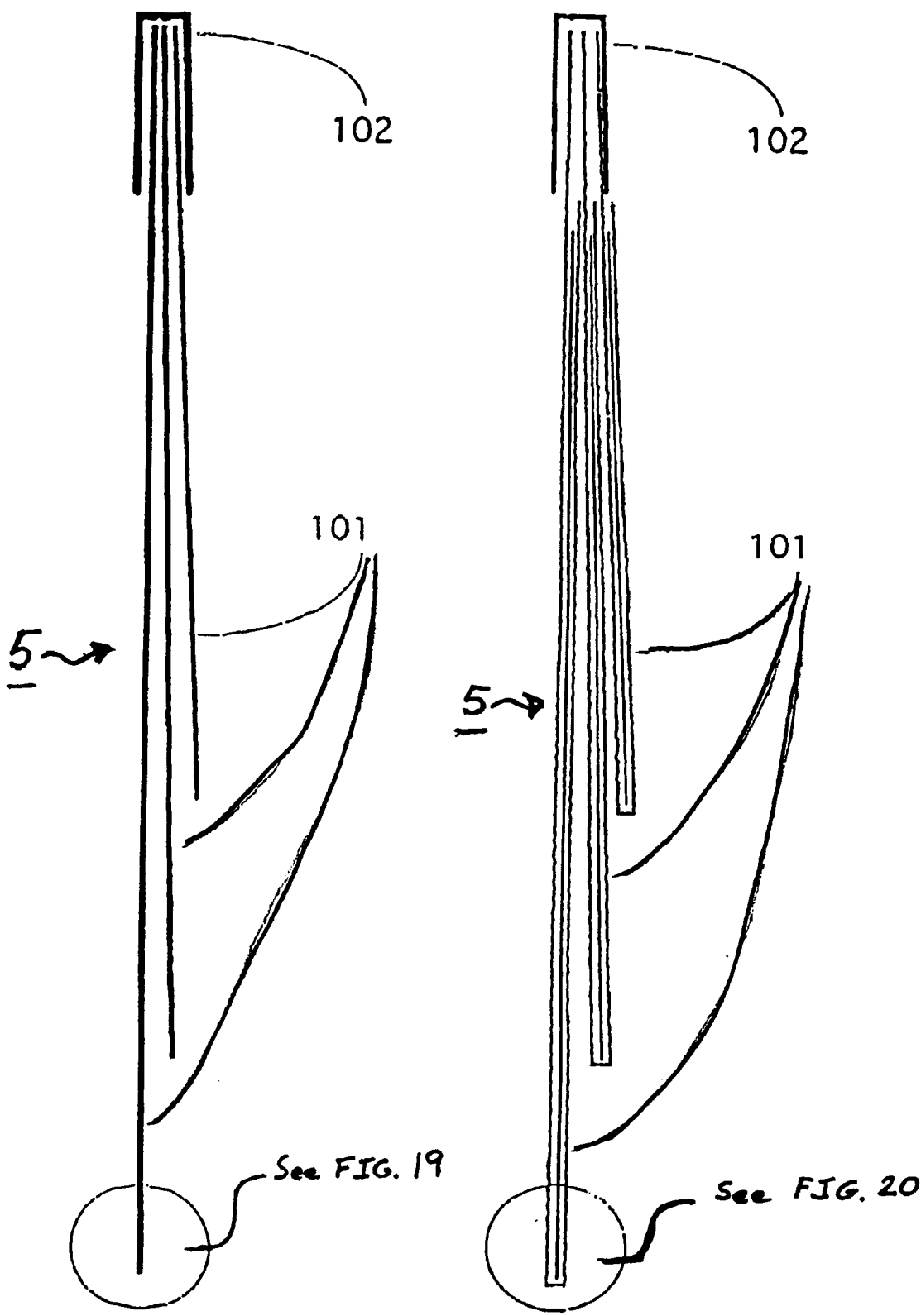
FIG. 17 illustrates a sectional view of the advertising material without lamination.
FIG. 18 illustrates a sectional view of the advertising material with lamination.

FIG. 17 illustrates a sectional view of the advertising material 5 without lamination.

FIG. 18 illustrates a sectional view of the advertising material 5 with lamination.

FIG. 19 illustrates an exploded sectional view of the advertising material 5 from FIG. 17.

FIG. 20 illustrates an exploded sectional view of the advertising material 5 with the laminate cover 106 from FIG. 18. A laminate cover 106 covers and protects an advertisement, or an item, in the array of advertising material 101. The laminate cover 106 can partially and/or fully cover the front and/or the back of the advertising material. Preferably, the laminate cover 106 is a transparent material, for example, a clear polymer coating.

The third embodiment of the invention is preferably implemented if multiple advertisements, or items, are desired. In the third embodiment, the natural decor of the cover material 13 is preserved.

FIG. 21 illustrates a sectional view of an example of displaying the advertising material 5. The advertising material 5 exemplified here can be an information guide to direct passengers or to display a company's name 71 or general information 72. The advertising material 5 in FIG. 21 can be one of the items in the array of advertising material 101 in the third embodiment.

The advertising material 5, the array of advertising material 101, and the aspects and features of the advertising material 5 and the array of advertising material 101, can be used interchangeably in all of the embodiments of the invention.

The shape, structure, and so on of the movable tray table 2 are not restricted as per the embodiments of the invention, and depending on the application, the moveable tray table 2 can be designed as needed.

The shapes of the advertising material 5, the protective sheet 4, and the tough decorative cover material 17 preferably coincide with the shape of the housing space 3. As an option, the advertising material 5, the protective sheet 4, and the tough decorative cover material 17 can each be any shape that can be located within the housing space 3.

The method of the invention includes locating (e.g., placing, replacing, or removing) and/or presenting advertising material 5 in the housing space 3, as per the various embodiments of the invention. The method of the invention can be practiced, for example, by: a manufacturer of the apparatus of the invention; an owner of a vehicle having the apparatus of the invention; an operator of a vehicle having the apparatus of the invention; and anyone locating and/or presenting advertising material in the apparatus of the invention.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method of advertising, comprising the step of placing advertising material in an apparatus for the display of advertising material, the apparatus comprising:

a substantially upright backrest of a seat having a front surface and a posterior surface opposite said front surface, said backrest having a housing space therein accessible only from the posterior surface of said backrest;

a movable tray table storable within said housing space, said movable tray table being movable between a state of nonuse when stored within said housing space and a state of use when withdrawn from said housing space; and an attachment to secure the advertising material within said housing space, the advertising material being viewable by a person facing the posterior surface of said backrest when said movable tray table is in the state of use, and not viewable when said movable tray table is in the state of nonuse.

2. A method of advertising as in claim 1, wherein said attachment comprises a clamp, wherein said clamp is operative to couple the advertising material to the backrest.

3. A method of advertising as in claim 2, further comprising a fastener coupling the clamp to the backrest.

4. A method of advertising as in claim 2, wherein said attachment comprises a removable adhesive between the advertising material and the backrest.

5. A method of advertising as in claim 1, further comprising a cover material covering said posterior surface of said backrest within said housing space.

6. A method of advertising as in claim 5, wherein the cover material is a tough decorative cover material.

7. A method of advertising as in claim 5, wherein said attachment comprises:

a protective sheet between the cover material and the advertising material; and a removable adhesive between the cover material and the protective sheet.

8. A method of advertising as in claim 7, wherein the protective sheet comprises a transparent material.

9. An apparatus as in claim 1, wherein said attachment comprises a receptacle pocket to contain the advertising material.

10. A method of advertising as in claim 9, wherein the receptacle pocket comprises at least one sealed edge.

11. A method of advertising as in claim 9, wherein the receptacle pocket comprises one of a flap and a removable adhesive.

12. A method of advertising as in claim 9, wherein at least one side of the receptacle pocket comprises transparent material.

13. A method of advertising as in claim 1, wherein said attachment comprises a binding to bind the advertising material such that the advertising material is accessible when bound.

14. A method of advertising as in claim 13, wherein the binding binds at least one item of advertising material.

15. A method of advertising as in claim 1, wherein the advertising material comprises an advertising display coupled to an advertising display sheet.

16. A method of advertising as in claim 2, wherein the advertising display is printed on the advertising display sheet.

17. A method of advertising as in claim 15, wherein the advertising material further comprises a lamination coupled to the advertising display.

18. A method of advertising as in claim 17, wherein the lamination is transparent.

19. A method of advertising as in claim 15, wherein the advertising display sheet is transparent.

20. A method of advertising as in claim 15, wherein the advertising material is laminated.

21. A method of advertising, comprising the step of placing advertising material in a vehicle for presenting advertising material, the vehicle comprising:
   a seat in the vehicle, the seat comprising:
      a substantially upright backrest having a front surface and a posterior surface opposite said front surface, said backrest having a housing space therein accessible only from the posterior surface of said backrest;
      a movable tray table storable within said housing space, said movable tray table being movable between a state of nonuse when stored within said housing space and a state of use when withdrawn from said housing space; and
      an attachment to secure the advertising material within said housing space, the advertising material being viewable by a person facing the posterior surface of said backrest when said movable tray table is in the state of use, and not viewable when said movable tray table is in the state of nonuse.

22. A method of advertising, comprising:
   locating advertising material in a backrest having a front surface and a posterior surface opposite said front surface, said backrest having a housing space therein accessible only from the posterior surface of said backrest, said backrest coupled to a movable tray table storable within said housing space, said movable tray table being movable between a state of nonuse when stored within said housing space and a state of use when withdrawn from said housing space, said backrest coupled to an attachment to secure the advertising material within said housing space, the advertising material being viewable by a person facing the posterior surface of said backrest when said movable tray table is in the state of use, and not viewable when said movable tray table is in the state of nonuse.

23. A method of advertising, comprising: presenting advertising material in a backrest having a front surface and a posterior surface opposite said front surface, said backrest having a housing space therein accessible only from the posterior surface of said backrest, said backrest coupled to a movable tray table storable within said housing space, said movable tray table being movable between a state of nonuse when stored within said housing space and a state of use when withdrawn from said housing space, said backrest coupled to an attachment to secure the advertising material within said housing space, the advertising material being viewable by a person facing the posterior surface of said backrest when said movable tray table is in the state of use, and not viewable when said movable tray table is in the state of nonuse.

24. A method of advertising, comprising the step of placing advertising material in an apparatus for presenting advertising material, the apparatus comprising:
   a substantially upright backrest having a front surface and a posterior surface opposite said front surface, said backrest having a housing space therein accessible only from the posterior surface of said backrest;
   a movable tray table storable within said housing space, said movable tray table being movable between a state of nonuse when stored within said housing space and a state of use when withdrawn from said housing space; and
   means for presenting the advertising material within said housing space, the advertising material being viewable by a person facing the posterior surface of said backrest when said movable tray table is in the state of use, and not viewable when said movable tray table is in the state of nonuse.

* * * * *